United States Patent
Fujimoto

(10) Patent No.: US 10,384,823 B2
(45) Date of Patent: Aug. 20, 2019

(54) IMAGE FORMING APPARATUS AND IMAGE FORMING SYSTEM WITH INFORMATION PRESENTATION FOR RESUMING PRINTING AFTER OCCURRENCE OF ERROR

(71) Applicant: RISO KAGAKU CORPORATION, Tokyo (JP)

(72) Inventor: Masatoshi Fujimoto, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 615 days.

(21) Appl. No.: 14/798,822

(22) Filed: Jul. 14, 2015

(65) Prior Publication Data
US 2016/0031578 A1 Feb. 4, 2016

(30) Foreign Application Priority Data

Jul. 31, 2014 (JP) ................................ 2014-155998

(51) Int. Cl.
*B65B 57/00* (2006.01)
*B65B 63/00* (2006.01)
(Continued)

(52) U.S. Cl.
CPC ............ *B65B 63/005* (2013.01); *B65B 57/08* (2013.01); *B65B 57/16* (2013.01); *B65B 61/025* (2013.01);
(Continued)

(58) Field of Classification Search
CPC . B65H 7/06; B65H 7/12; B65H 7/125; B65H 7/20; G03G 15/5012;
(Continued)

(56) References Cited

U.S. PATENT DOCUMENTS 4,723,148 A * 2/1988 Hamakawa ............ G03G 15/23
399/87
4,739,366 A * 4/1988 Braswell ................ G03G 15/70
399/10
(Continued)

FOREIGN PATENT DOCUMENTS

EP 1199677 A2 4/2002
JP H10-35997 A 2/1998
(Continued)

OTHER PUBLICATIONS

Office Action issued in Japan family member Patent Appl. No. 2014-155998, dated Feb. 27, 2018.

*Primary Examiner* — Stephen F. Gerrity
*Assistant Examiner* — Joshua G Kotis
(74) *Attorney, Agent, or Firm* — Greenblum & Bernstein, P.L.C.

(57) ABSTRACT

A letter number specifying unit specifies a letter number of a sealed letter to be informed to a user, based on a content of a transfer error detected by an error detector. A searching unit searches a letter-number-specific print content table, in which letter number identification information for identifying each letter number, and print content information indicating a content of an image to be printed on a sheet which forms the sealed letter of each letter number are associated with each other, and finds the print content information associated with the letter number identification information of a letter number identification code read by a code reader from the sheet which forms the sealed letter of the letter number specified by the letter number specifying unit. An information displaying unit displays the print content information found by the searching unit on a display.

10 Claims, 8 Drawing Sheets

(51) Int. Cl.
  *B65H 7/06* (2006.01)
  *G06F 3/12* (2006.01)
  *G06K 15/00* (2006.01)
  *B65B 57/08* (2006.01)
  *B65B 57/16* (2006.01)
  *B65B 61/02* (2006.01)
  *B65B 11/48* (2006.01)
  *B65B 61/26* (2006.01)
  *B65B 25/14* (2006.01)
  *B65B 51/02* (2006.01)
  *B65B 63/04* (2006.01)
  *B43M 3/04* (2006.01)
  *B43M 5/04* (2006.01)

(52) U.S. Cl.
  CPC .............. *B65H 7/06* (2013.01); *G06F 3/121* (2013.01); *G06F 3/1234* (2013.01); *G06K 15/408* (2013.01); *B43M 3/04* (2013.01); *B43M 5/04* (2013.01); *B65B 11/48* (2013.01); *B65B 25/145* (2013.01); *B65B 51/026* (2013.01); *B65B 61/26* (2013.01); *B65B 63/04* (2013.01)

(58) Field of Classification Search
  CPC .. G03G 15/5029; G03G 15/70; G03G 15/703; G03G 21/14; G06K 15/408; G06K 15/4085; H04N 1/4466; G06F 3/1207; G06F 3/121; G06F 3/1234; G06F 3/1235
  USPC .................. 271/2, 259–263, 258.02–258.05, 271/265.01–265.04
  See application file for complete search history.

(56) References Cited

U.S. PATENT DOCUMENTS

| | | | | |
|---|---|---|---|---|
| 5,027,587 A * | 7/1991 | Ramsey | ............... | B07C 1/00 53/131.1 |
| 5,034,780 A * | 7/1991 | Kotabe | ............... | B41J 11/006 271/259 |
| 5,124,748 A * | 6/1992 | Tanabe | ............... | G03G 15/507 101/DIG. 37 |
| 5,314,566 A * | 5/1994 | Gallagher | ......... | G07B 17/00661 156/350 |
| 5,644,494 A * | 7/1997 | Richardson | ......... | B41J 13/0027 700/112 |
| 5,684,934 A * | 11/1997 | Chen | ............... | G06F 3/121 358/1.14 |
| 5,845,057 A * | 12/1998 | Takeda | ............... | G06F 3/1297 358/1.14 |
| 6,026,385 A * | 2/2000 | Harvey | ............... | G07B 17/00024 705/401 |
| 6,119,051 A * | 9/2000 | Anderson, Jr. | ... | G07B 17/00467 700/221 |
| 6,747,749 B1 * | 6/2004 | Pollard | ............... | G07B 17/00467 270/58.06 |
| 7,254,252 B2 * | 8/2007 | Bergoend | ............... | G06K 15/00 382/101 |
| 9,102,170 B2 * | 8/2015 | Hanamoto | ............... | B41J 13/0009 |
| 9,426,331 B2 * | 8/2016 | Furuki | ............... | B41J 2/325 |
| 2006/0284360 A1 * | 12/2006 | Hume | ............... | B42C 1/10 270/1.02 |
| 2007/0177764 A1 * | 8/2007 | Harman | ............... | G07B 17/00467 382/103 |
| 2007/0179664 A1 * | 8/2007 | Welch | ............... | G06F 3/1208 700/220 |
| 2007/0201091 A1 * | 8/2007 | Tanaka | ............... | G06F 3/1204 358/1.16 |
| 2008/0030771 A1 * | 2/2008 | Alleshouse | ............... | G06F 17/212 358/1.15 |
| 2008/0055626 A1 * | 3/2008 | Root | ............... | G03G 15/5012 358/1.14 |
| 2008/0079980 A1 * | 4/2008 | Matsubara | ............... | B41J 13/0009 358/1.14 |
| 2008/0143031 A1 * | 6/2008 | Hascup | ............... | B43M 3/045 270/1.01 |
| 2008/0306884 A1 * | 12/2008 | Weinberg | ............... | B42D 15/02 705/410 |
| 2009/0122327 A1 * | 5/2009 | Sakai | ............... | G03G 15/00 358/1.9 |
| 2009/0161140 A1 * | 6/2009 | Devries | ............... | G03G 15/5012 358/1.14 |
| 2009/0219572 A1 * | 9/2009 | Iwata | ............... | G03G 15/5012 358/1.15 |
| 2009/0282783 A1 * | 11/2009 | Maaranen | ............... | B43M 5/042 53/411 |
| 2011/0069359 A1 * | 3/2011 | Tojo | ............... | B65H 5/062 358/498 |
| 2011/0211003 A1 * | 9/2011 | Kusakabe | ............... | B41J 3/60 347/14 |
| 2012/0069374 A1 * | 3/2012 | Sasakura | ............... | G06K 15/1809 358/1.13 |
| 2012/0260605 A1 * | 10/2012 | Nozawa | ............... | B43M 3/04 53/55 |
| 2013/0104498 A1 * | 5/2013 | Naitou | ............... | B65B 11/48 53/206 |
| 2013/0302045 A1 * | 11/2013 | Serizawa | ............... | G03G 15/70 399/21 |
| 2014/0240741 A1 * | 8/2014 | Ogawa | ............... | G06F 3/1264 358/1.13 |
| 2014/0284864 A1 * | 9/2014 | Miyashita | ............... | B07C 3/18 270/58.04 |
| 2014/0355054 A1 | 12/2014 | Oi | | |
| 2015/0049356 A1 * | 2/2015 | Saitsu | ............... | B65H 7/06 358/1.14 |

FOREIGN PATENT DOCUMENTS

| | | |
|---|---|---|
| JP | 2002-137458 A | 5/2002 |
| JP | 4328059 | 9/2009 |
| JP | 2012-192672 A | 10/2012 |

* cited by examiner

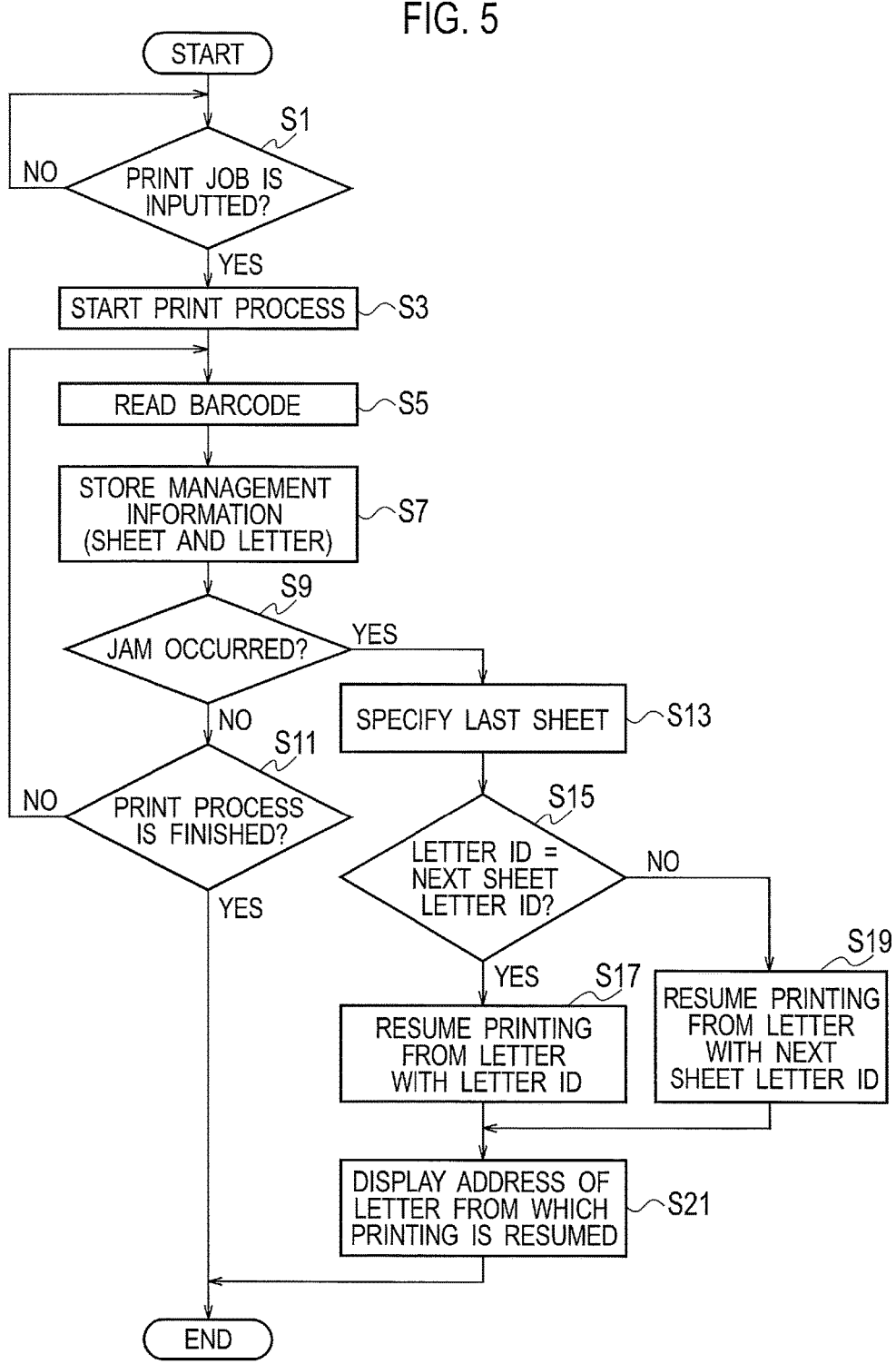

| SHEET ID | STATUS |
|---|---|
| 0001 | PRINTED |
| 0002 | PRINTED |
| 0003 | PRINTED |
| 0004 | JAM ERROR |
| 0005 | JAM ERROR |

| SHEET ID | LETTER ID | NEXT SHEET LETTER ID |
|---|---|---|
| 0001 | 001 | 001 |
| 0002 | 001 | 001 |
| 0003 | 001 | 002 |
| 0004 | — | — |
| 0005 | — | — |

Jam has occurred.

Printing will be resumed from letter for employee number 1235 Hanako Tanaka.

Multi-feed has occurred.

Remove sealed letters
for employee number 1234 Taro Yamamoto
and employee number 1235 Hanako Tanaka
from enclosing-sealing apparatus.
Printing will be resumed from letter
for employee number 1234 Taro Yamamoto.

OK

39a

IMAGE FORMING APPARATUS AND IMAGE FORMING SYSTEM WITH INFORMATION PRESENTATION FOR RESUMING PRINTING AFTER OCCURRENCE OF ERROR

CROSS REFERENCE TO RELATED APPLICATION

This application is based upon and claims the benefit of priority from the prior Japanese Patent Application No. 2014-155998, filed on Jul. 31, 2014, the entire contents of which are incorporated herein by reference.

BACKGROUND

1. Technical Field

The disclosure relates to an image forming apparatus and an image forming system configured to perform printing of an image onto a sheet which forms a sealed letter to be made by an enclosing-sealing apparatus, on a sealed letter basis based on a print job from a terminal.

2. Related Art

An enclosing-sealing system configured to make a sealed letter, which is a sealed envelope with a content enclosed therein, is configured such that a content sheet and an envelope sheet printed in an image forming apparatus are, for example, folded in an enclosing-sealing apparatus to form a content and an envelope, respectively, and the envelope with the content enclosed therein is sealed to make a sealed letter.

Here, when a sheet transfer error such as a jam or a multi-feed occurs in the image forming apparatus, the print process for the content sheet and the envelope sheet is stopped. For those sheets discharged from the image forming apparatus before the stop, the enclosing-sealing process is still performed in the enclosing-sealing apparatus in the order in which the sheets are discharged. That is, even when the image forming apparatus stops due to a sheet transfer error, the enclosing-sealing apparatus can still perform the enclosing-sealing process on those sheets discharged from the image forming apparatus before the stop.

When a sheet transfer error occurs in the image forming apparatus, the printing needs to be resumed from the page involved in the error. Japanese Patent No. 4328059 proposes a technique which includes, when a sheet transfer error occurs, displaying image data on the last properly discharged page on a display, and prompting the user to designate the page before or after the last page as a page from which to resume the printing.

SUMMARY

Meanwhile, when the image forming apparatus of the enclosing-sealing system stops due to a sheet transfer error, the discharge of sheets from the image forming apparatus stops, and the enclosing-sealing process in the enclosing-sealing apparatus stops accordingly. Then, when the printing is resumed in the image forming apparatus, the printing needs to be resumed on a sealed letter basis from the content sheet or envelope sheet of the next sealed letter to be made after the last sealed letter made in the enclosing-sealing apparatus.

Moreover, in the case where the sheet transfer error occurring in the image forming apparatus is a multi-feed, the multi-fed sheets might already be discharged from the image forming apparatus and the enclosing-sealing apparatus might already finish making a sealed letter using these sheets by the time a sheet thickness sensor, which is provided on a sheet transfer path in the image forming apparatus, detects the multi-feed by comparing the detected sheet thicknesses of sheets of the same size with each other.

In such a case, the sealed letter made from the multi-fed content sheets or envelope sheets is desired to be removed from all the sealed letters already made. Moreover, the printing by the image forming apparatus needs to be resumed on a sealed letter basis from the sealed letter including the content sheet or envelope sheet involved in the multi-feed.

As described above, when a sheet transfer error occurs in the image forming apparatus of the enclosing-sealing system, the printing needs to be resumed on a sealed letter basis and the sealed letter made using the sheet (s) involved in the error needs to be removed, but such needs cannot be fulfilled by the above-proposed technique, which includes displaying the image data on the last properly discharged page.

It is an object of the present invention to provide an image forming apparatus and an image forming system configured to perform printing of an image onto a sheet which forms a sealed letter to be made by an enclosing-sealing apparatus, on a sealed letter basis by the image forming apparatus based on a print job from a terminal, and to be capable of presenting useful information when the printing is to be resumed after an error such as a sheet transfer error occurs which involves stopping the printing in the image forming apparatus.

An image forming apparatus in accordance with some embodiments includes: a printing unit configured to perform printing of an image on a sheet forming a sealed letter to be made by an enclosing-sealing apparatus, on a sealed letter basis, the image including a letter number identification code being coded letter number identification information for identifying a letter number of the sealed letter to be made by the enclosing-sealing apparatus by using the sheet; a connecting transfer path for passing the sheet printed by the printing unit to the enclosing-sealing apparatus; a code reader configured to read the letter number identification code from the sheet to be passed to the enclosing-sealing apparatus; an error detector configured to detect an occurrence of a transfer error of the sheet; a letter number specifying unit configured to specify the letter number of the sealed letter to be informed to a user, based on a content of the transfer error detected by the error detector; a searching unit configured to search a letter-number-specific print content table, in which the letter number identification information for identifying each letter number, and print content information indicating a content of the image to be printed on the sheet which forms the sealed letter of each letter number are associated with each other, and to find the print content information associated with the letter number identification information of the letter number identification code read by the code reader from the sheet which forms the sealed letter of the letter number specified by the letter number specifying unit; and an information displaying unit configured to display the print content information found by the searching unit on a display.

According to the above configuration, printing of an image onto a sheet which forms a sealed letter to be made by the enclosing-sealing apparatus is performed on a sealed letter basis by the image forming apparatus based on a print job from a terminal, and useful information can be presented when the printing is to be resumed after an error such as a sheet transfer error occurs which involves stopping the printing in the image forming apparatus.

Specifically, when a sheet transfer error occurs, the letter number of the sealed letter to be informed is specified based on the content of the transfer error. For example, in the case where the transfer error that has occurred is a jam, the enclosing-sealing apparatus will not be able to make the sealed letter using the sheet that has failed to be discharged due to the jam and all the sheets to be used for that sealed letter must be printed again after the printing is resumed. For this reason, the letter number of that sealed letter is specified as the letter number to be informed.

Then, the print content information corresponding to the letter number identification information of the letter number identification code read from the image on the sheet which forms the sealed letter of the specified letter number to be informed is displayed on the display. Thus, from the print content information displayed on the display, it is possible to specify the sealed letter of the letter number corresponding to the content of the transfer error which has occurred and the sheets which form that sealed letter. Hence, when the printing is to be resumed after the transfer error is solved, useful information can be presented such for example as information on from which sealed letter's sheets the printing should be resumed.

The error detector may be configured to detect a multi-feed of sheets as the transfer error. The letter number specifying unit may be configured to specify, as the letter number to be informed, the letter number of the sealed letter to be made by the enclosing-sealing apparatus by using the sheets detected as the multi-feed by the error detector. The information displaying unit may be configured to display the print content information found by the searching unit on the display as the print content information on the sealed letter to be removed which is to be made by the enclosing-sealing apparatus by using the sheets detected as the multi-feed by the error detector.

According to the above configuration, in the case where the transfer error which has occurred is a multi-feed of sheets, the transfer error by the multi-feed of sheets is detected by the error detector by, for example, comparing sheet thicknesses detected respectively from sheets of the same type on the transfer path.

For this reason, when the sheet thickness of the sheet, of the sheets of the same type, detected second is smaller than the sheet thickness of the sheet detected first, the error detector detects that a multi-feed has occurred with the sheet of which the sheet thickness is detected first. By this point, the multi-fed sheets might already be discharged to the enclosing-sealing apparatus and the enclosing-sealing apparatus might already finish making a sealed letter using the multi-fed sheets.

In view of this, the print content information is displayed on the display so that one can specify the sealed letter made by the enclosing-sealing apparatus using the multi-fed sheets from its external appearance and remove that sealed letter from all the sealed letters which are already made, before handing the sealed letter to the person to which it is addressed or dropping the sealed letter into a post box or the like.

The image may further include a next sheet letter number identification code being coded next sheet letter number identification information for identifying the letter number of the sealed letter to be made by the enclosing-sealing apparatus by using a next sheet passed to the enclosing-sealing apparatus after the sheet. The code reader may be further configured to read the next sheet letter number identification code from the sheet to be passed to the enclosing-sealing apparatus. The letter number specifying unit may be configured to specify a last sheet passed to the enclosing-sealing apparatus immediately before the sheet involved in the transfer error detected by the error detector, and specify, as the letter number to be informed, the letter number corresponding to the next sheet letter number identification information of the next sheet letter number identification code read by the code reader from the specified last sheet. The information displaying unit may be configured to display the print content information found by the searching unit on the display as the print content information on the sealed letter of the letter number to be printed first for resuming a printing after the transfer error detected by the error detector is solved.

According to the above configurations, if the letter number corresponding to the next sheet letter number identification information of the next sheet letter number identification code read from the sheet discharged to the enclosing-sealing apparatus before a sheet involved in a transfer error, is the next letter number after the letter number corresponding to the letter number identification information of the letter number identification code of that sheet, then, all the sheets of the letter number corresponding to the letter number identification information of the letter number identification code has already been discharged to the enclosing-sealing apparatus before the sheet involved in the transfer error and the enclosing-sealing apparatus has already made a sealed letter of that letter number.

On the other hand, if the letter number corresponding to the next sheet letter number identification information of the next sheet letter number identification code read from the sheet discharged to the enclosing-sealing apparatus before a sheet involved in a transfer error, is the same letter number as the letter number corresponding to the letter number identification information of the letter number identification code of that sheet, then, one of the sheets of the letter number corresponding the letter number identification information of the letter number identification code is the sheet involved in the transfer error, and the enclosing-sealing apparatus has not yet made the sealed letter of that letter number.

In view of this, in the case where the letter number identification information of the letter number identification code and the next sheet letter number identification information of the next sheet letter number identification code read from the last sheet discharged to the enclosing-sealing apparatus coincide with each other, the letter number of the sealed letter to be made using the sheet discharged immediately before the transfer error is set as the letter number to be displayed; in the case where the above letter number identification information and next sheet letter number identification information do not coincide with each other, the next letter number after the letter number to be made using the sheet discharged immediately before the transfer error is set as the letter number to be displayed on the display. In this way, the print content information on the letter number to be printed first when the printing is resumed after the transfer error is solved can be displayed appropriately on the display.

An image forming system in accordance with some embodiments includes an image forming apparatus and a terminal. The image forming apparatus includes: a printing unit configured to perform printing of an image on a sheet forming a sealed letter to be made by an enclosing-sealing apparatus, on a sealed letter basis, the image including a letter number identification code being coded letter number identification information for identifying a letter number of the sealed letter to be made by the enclosing-sealing apparatus by using the sheet; a connecting transfer path for passing the sheet printed by the printing unit to the enclosing-sealing apparatus; a code reader configured to read the letter number identification code from the sheet to be passed to the enclosing-sealing apparatus; an error detector configured to detect an occurrence of a transfer error of the sheet; a letter number specifying unit configured to specify the letter number of the sealed letter to be informed to a user, based on a content of the transfer error detected by the error detector; a searching unit configured to search a letter-number-specific print content table, in which the letter number identification information for identifying each letter number, and print content information indicating a content of the image to be printed on the sheet which forms the sealed letter of each letter number are associated with each other, and to find the print content information associated with the letter number identification information of the letter number identification code read by the code reader from the sheet which forms the sealed letter of the letter number specified by the letter number specifying unit; and an information displaying unit configured to display the print content information found by the searching unit on a display. The terminal includes: a printer driver configured to output a print job to the image forming apparatus, the print job instructing printing of the image including the letter number identification code on the sheet which forms the sealed letter; and a letter number information outputting unit configured to output information of the letter-number-specific print content table to the image forming apparatus together with the print job.

The error detector may be configured to detect a multi-feed of sheets as the transfer error. The letter number specifying unit may be configured to specify, as the letter number to be informed, the letter number of the sealed letter to be made by the enclosing-sealing apparatus by using the sheets detected as the multi-feed by the error detector. The information displaying unit may be configured to display the print content information found by the searching unit on the display as the print content information on the sealed letter to be removed which is to be made by the enclosing-sealing apparatus by using the sheets detected as the multi-feed by the error detector.

An image forming system in accordance with some embodiments includes an image forming apparatus and a terminal. The image forming apparatus includes: a printing unit configured to perform printing of an image on a sheet forming a sealed letter to be made by an enclosing-sealing apparatus, on a sealed letter basis, the image including a letter number identification code being coded letter number identification information for identifying a letter number of the sealed letter to be made by the enclosing-sealing apparatus by using the sheet and a next sheet letter number identification code being coded next sheet letter number identification information for identifying the letter number of the sealed letter to be made by the enclosing-sealing apparatus by using a next sheet passed to the enclosing-sealing apparatus after the sheet; a connecting transfer path for passing the sheet printed by the printing unit to the enclosing-sealing apparatus; a code reader configured to read the letter number identification code and the next sheet letter number identification code from the sheet to be passed to the enclosing-sealing apparatus; an error detector configured to detect an occurrence of a transfer error of the sheet; a letter number specifying unit configured to specify the letter number of the sealed letter to be informed to a user, based on a content of the transfer error detected by the error detector, the letter number specifying unit further configured to specify a last sheet passed to the enclosing-sealing apparatus immediately before the sheet involved in the transfer error detected by the error detector and specify, as the letter number to be informed, the letter number corresponding to the next sheet letter number identification information of the next sheet letter number identification code read by the code reader from the specified last sheet; a searching unit configured to search a letter-number-specific print content table, in which the letter number identification information for identifying each letter number, and print content information indicating a content of the image to be printed on the sheet which forms the sealed letter of each letter number are associated with each other, and to find the print content information associated with the letter number identification information of the letter number identification code read by the code reader from the sheet which forms the sealed letter of the letter number specified by the letter number specifying unit; and an information displaying unit configured to display the print content information found by the searching unit on a display, the information displaying unit configured to display the print content information found by the searching unit on the display as the print content information on the sealed letter of the letter number to be printed first for resuming a printing after the transfer error detected by the error detector is solved. The terminal includes: a printer driver configured to output a print job to the image forming apparatus, the print job instructing printing of the image including the letter number identification code and the next sheet letter number identification code on the sheet which forms the sealed letter; and a letter number information outputting unit configured to output information of the letter-number-specific print content table to the image forming apparatus together with the print job.

According to the above configurations, advantageous effects similar to those by the above image forming apparatus are achieved.

BRIEF DESCRIPTION OF DRAWINGS

FIG. 5 is a flowchart showing a procedure performed upon occurrence of an error based on control by an image formation controller of the image forming apparatus in the image forming system according to the first embodiment.

FIG. 9 is an explanatory diagram of a status screen of an error state displayed on the display of the image forming apparatus in FIG. 2 by the procedure in FIG. 8.

DETAIL DESCRIPTION

Figure 1:
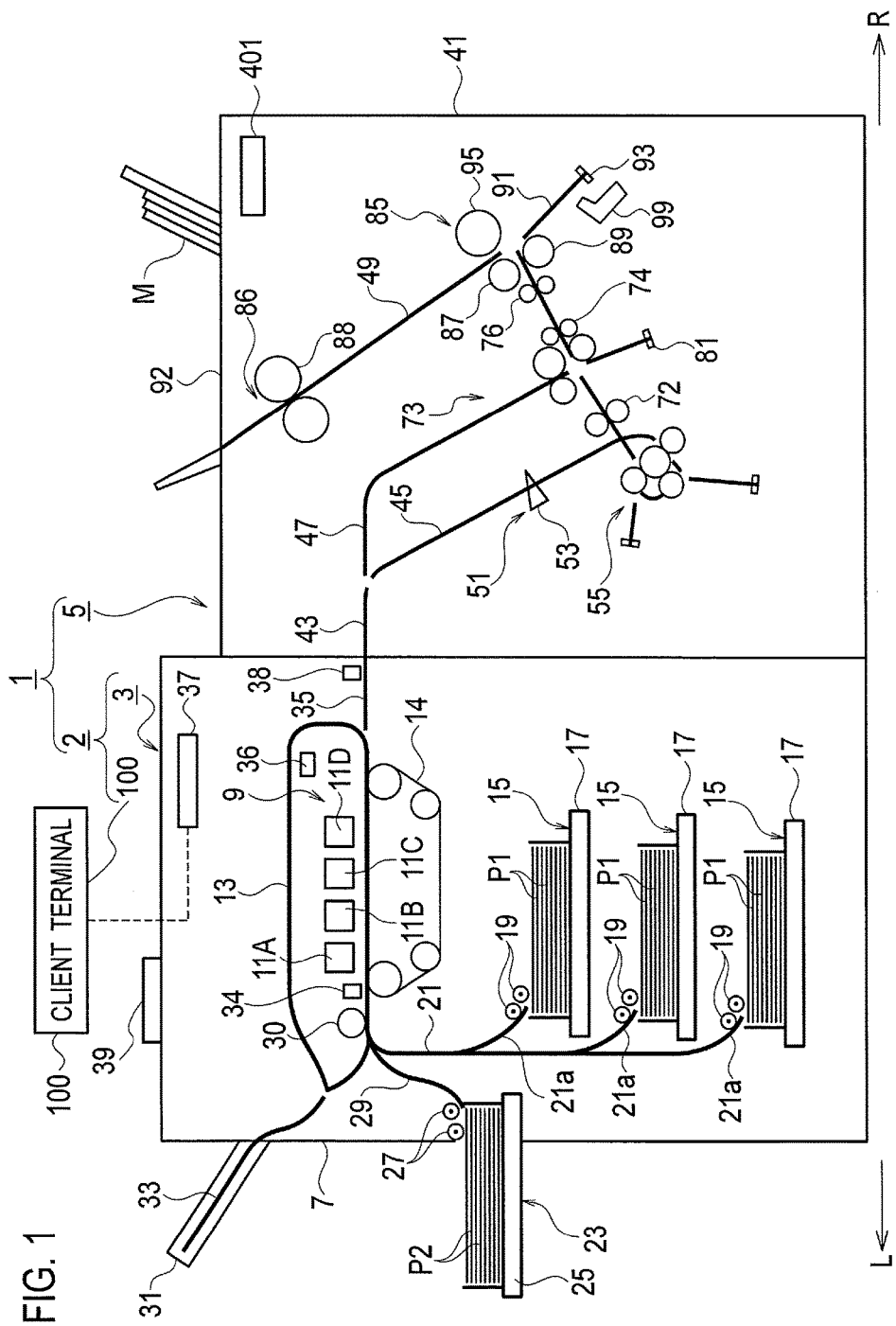
FIG. 1 is an explanatory diagram of an enclosing-sealing system formed by an image forming system and an enclosing-sealing apparatus according to first and second embodiments of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for an embodiment of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Configuration of Enclosing-Sealing System

Embodiments of the present invention will be described below with reference to the drawings. Note that in the description, "upstream" refers to an upstream side as seen from the direction of transfer of content sheets P1 and the like, and "downstream" refers to a downstream side as seen from the direction of transfer of content sheets and the like. In drawings, "L" and "R" represent left and right, respectively.

First, the schematic configuration of an enclosing-sealing system, which is common to a first embodiment and a second embodiment of the present invention to be described later, will be described with reference to FIG. 1.

An enclosing-sealing system 1 shown in FIG. 1 has an image forming system 2 and an enclosing-sealing apparatus 5. The image forming system 2 has an image forming apparatus 3 and a client terminal 100.

The image forming apparatus 3 is configured to perform printing on a plurality of content sheets P1 and an envelope sheet P2. The enclosing-sealing apparatus 5 is configured to form a content B and an envelope E respectively from the plurality of printed content sheets P1 and the printed envelope sheet P2 and to seal the envelope E with the content B enclosed therein to thereby make a sealed letter M.

The printing of the content sheets P1 and the envelope sheet P2 by the image forming apparatus 3 is performed based on a print job inputted from the client terminal 100 such as a personal computer connected to the image forming apparatus 3. The making of the sealed letter M by the enclosing-sealing apparatus 5 is performed based on attribute information of the print job inputted from the image forming apparatus 3, the attribute information being information on the enclosing and the sealing.

Configuration of Client Terminal

Figure 2:
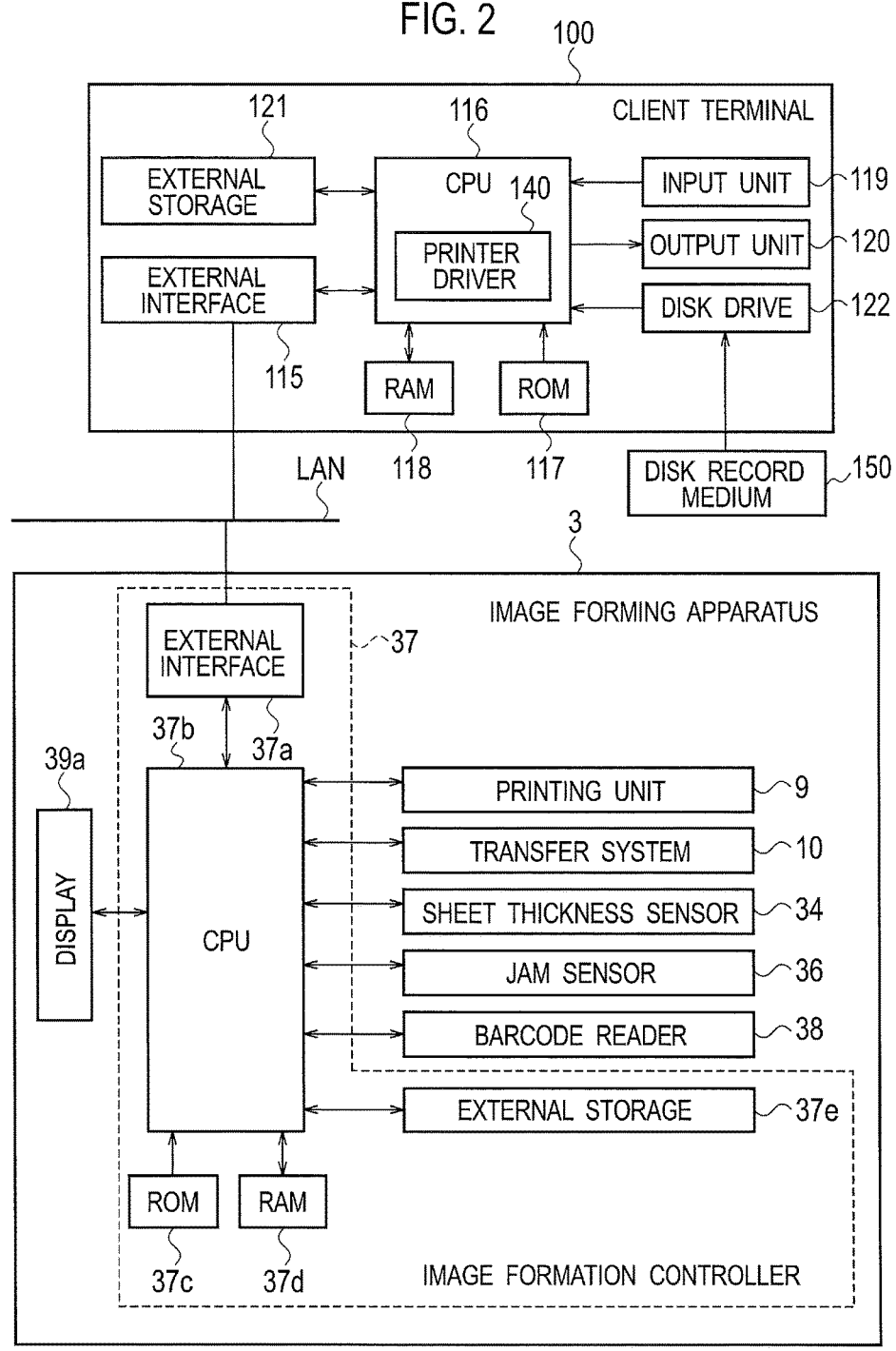
FIG. 2 is a bloc diagram showing the configuration of the control systems of an image forming apparatus and a client terminal in FIG. 1.

As shown in FIG. 2, the client terminal 100 has a CPU 116 configured to execute various kinds of processing based on control programs stored in a ROM 117. Moreover, a RAM 118 functioning as a work area, an input unit 119 formed by a keyboard, a mouse, and/or the like, an output unit 120 formed by a liquid crystal display and/or the like, an external storage 121, and a disk drive 122 are connected to the CPU 116.

In the external storage 121, storage spaces are secured for an application program for creating original data including print images of documents, images, etc., a printer driver program for the image forming apparatus 3, and various other application programs. Moreover, in the external storage 121, a database space is secured for storing original data created using the application program and print data which is the print images in the original data converted into image data for printing in accordance with predetermined print setting information.

Here, the print setting information refers to information necessary for a print process and includes print sheet setting information such for example as the size of the original data, resolution information, the sizes (A4, A3, B4, B5, etc.) of the content sheet P1 and envelope sheet P2 (see FIG. 1) to be used in the printing, as well as their orientations (portrait or landscape) and paper qualities (e.g. a thick paper sheet with a large basis weight, a thin paper sheet with a small basis weight, etc). Moreover, this print setting information also includes information on print modes such as variable-data printing and finishing processes such as an enclosing-sealing process.

The CPU 116 is an arithmetic device formed by a processor, a memory, and other peripheral devices, and is configured to activate a given application program in the external storage 121 in response to an activate request inputted from the input unit 119. Moreover, the CPU 116 is configured to create original data which represent images specified by a parameter input from the input unit 119, for example, on the activated application program. The created original data is outputted and displayed on the output unit 120, or stored in the database space in the external storage 121 if a store request is inputted from the input unit 119.

The original data stored in the database space in the external storage 121 is read out from the external storage 121 in response to a read request inputted from the input unit 119 while the application program is activated. The print images in the original data thus read out can be displayed on the output unit 120. Moreover, the print images can be processed on the application program and re-created as new original data.

Figure 3A:
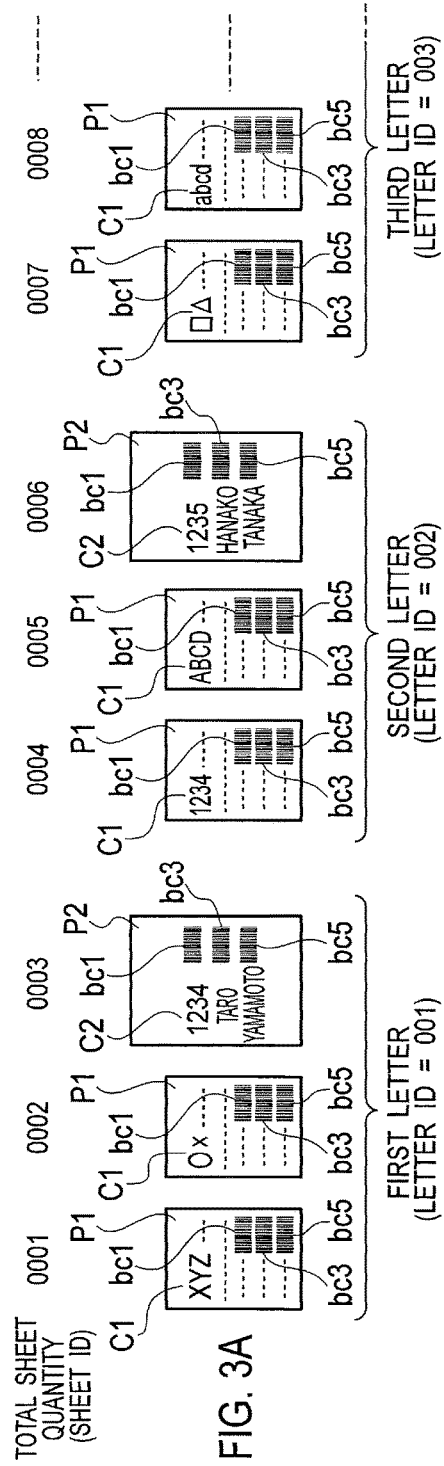
FIG. 3A is an explanatory diagram of original data created for each letter by the client terminal in FIG. 1.

FIG. 3A is an explanatory diagram showing an example of the original data created on the application program.

The original data shown in FIG. 3A is an example of original data about sealed letters M to be distributed to employees within a company. In this example, one sealed letter M to be distributed to each employee within the company is formed by two content sheets P1 and one envelope sheet P2. On the two content sheets P1, a notification C1 to be individually notified to the corresponding employee is printed. Moreover, on the one envelope sheet P2, an address C2 on the sealed letter M including the name of the employee's name and employee number is printed.

Thus, the original data has image data on the notification C1 and the address C2 to be printed respectively on the two content sheets P1 and the one envelope sheet P2 for all the letters.

It is to be noted that up to three types of barcodes bc1, bc3, and bc5 may be printed on each content sheet P1 and each envelope sheet P2 when necessary, together with the notification C1 and the address C2. In this case, the original data has image data on the notification C1 and the address C2 including the barcodes bc1, bc3, and bc5 for all the letters.

Here, the barcode bc1 (letter number identification code) is barcoded letter number identification information (letter ID) for identifying the sequential order (letter number) of the sealed letter M to be made using the content sheets P1 and the envelope sheet P2 on which this barcode bc1 is printed.

Moreover, the barcode bc3 (next sheet letter number identification information) is barcoded next sheet letter number identification information (next sheet letter ID) for identifying the sequential order of the sealed letter M using the next content sheet P1 or envelope sheet P2 to be transferred, printed, and discharged by the image forming apparatus 3 after the content sheet P1 or envelope sheet P2 on which this barcode bc3 is printed.

Thus, the letter number indicated by the next sheet letter number identification information (next sheet letter ID) of the barcode bc3 printed on each of the two content sheets P1 is the same as the letter number indicated by the letter number identification information of the above-mentioned barcode bc1 since the next sheet to be transferred, printed, and discharged by the image forming apparatus 3 is the other of the content sheets P1 or the envelope sheet P2 to be used for making the same sealed letter M.

On the other hand, the letter number indicated by the next sheet letter number identification information (next sheet letter ID) of the barcode bc3 printed on the envelope sheet P2 is the next letter number after the letter number indicated by the letter number identification information of the above-mentioned barcode bc1 since the next sheet to be transferred, printed, and discharged by the image forming apparatus 3 is a content sheet P1 to be used for making the next sealed letter M.

Further the barcode bc5 is barcoded total sheet quantity information (sheet ID) indicating the total quantity (number) of the content sheets P1 and the envelope sheet P2 transferred, printed, and discharged by the image forming apparatus 3 during execution of one print job.

These barcodes bc1, bc3, and bc5 are arranged at given intervals in the direction of transfer (e.g. longitudinal direction) of the content sheets P1 and envelope sheet P2 so that the barcodes bc1, bc3, and bc5 can be read sequentially one after another by one barcode reader on the transfer path of the content sheets P1 and envelope sheet P2 after the printing in the image forming apparatus 3.

After creating original image data for the notification C1 and the address C2, which include the barcodes bc1, bc3, and bc5 as mentioned above when necessary, with an original application program and the like, the CPU 116 virtually builds a printer driver 140 on the CPU 116 by executing the printer driver program on the CPU 116 upon input of a print request for the original data. Then, the CPU 116 creates print data from the original data with the printer driver 140 and outputs a print job including this print data to the image forming apparatus 3.

Note that in the case where the original data created with the original application program includes an image of the barcode bc1 which is barcoded letter number identification information, the CPU 116 creates a letter-number-specific print content table and outputs it to the image forming apparatus 3, in addition to outputting a print job including the print data of the original data to the image forming apparatus 3.

Figure 3B:
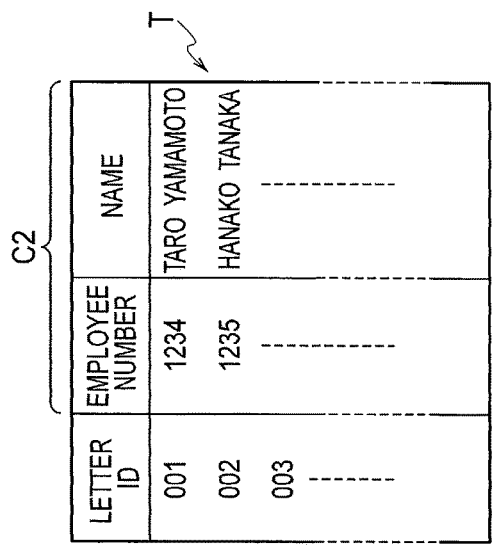
FIG. 3B is an explanatory diagram of a letter-number-specific print content table in which letter number identification information in FIG. 3A is associated with information on an address to be printed on an envelope sheet of a letter number corresponding to the letter number identification information.

Here, as shown in FIG. 3B, a letter-number-specific print content table T is a table in which the letter number identification information (letter ID) of the barcode bc1 to be printed on the content sheets P1 and envelope sheet P2 for each letter number, and the address C2 (print content information) to be printed on the envelope sheet P2 of the sealed letter M of the letter number corresponding to that letter number identification information are associated with each other. This letter-number-specific print content table is created by a process executed by the CPU 116 on the original application program.

The printer driver 140 is a data converting program configured to be executed on the client terminal 100 to control the image forming apparatus 3 connected to the client terminal 100. This printer driver 140 acquires original data having print images created by the original application program or the like, and creates print data in bitmap data format in accordance with the predetermined print setting information. Then, the printer driver 140 outputs a print job including the created print data and the above-mentioned print setting information to an external interface 37a of a later-described image formation controller 37 of the image forming apparatus 3 from an external interface 115.

The printer driver program and the various application programs for the CPU 116 to execute the above-described processes can be readout from a disk record medium 150 such as an optical disk through a disk drive 122 of the client terminal 100 and installed (stored) into the external storage 121.

Configuration of Image Forming Apparatus

As shown in FIG. 1, the image forming apparatus 3 is configured such that, based on content image data, a printing unit 9 therein performs printing on content sheets P1 each of which is fed by sheet feeding rollers 19 from a sheet feed tray 17 of a content sheet feeder 15 inside a casing 7 to a branching point 21a on a sheet-feeding transfer path 21 and further fed onto a print transfer path 13 by a registration roller 30 and a transfer belt 14.

Moreover, the image forming apparatus 3 is configured such that the printing unit 9 performs printing based on envelope image data on an envelope sheet P2 which is fed by sheet feeding rollers 27 from a sheet feed tray 25 of an envelope sheet feeder 23 onto a sheet-feeding transfer path 29 and further fed onto the print transfer path 13 by the registration roller 30 and the transfer belt 14.

In the case of double-sided printing, the content sheet P1 or envelope sheet P2 is turned upside down at a switchback transfer path 33 inside a sheet discharge tray 31 and fed again onto the print transfer path 13 by the registration roller 30 and the transfer belt 14.

A sheet thickness sensor 34 disposed downstream of the registration roller 30 is configured to detect the sheet thickness of the content sheet P1 or envelope sheet P2 fed onto the print transfer path 13. As the sheet thickness sensor 34, a reflective sensor configured to receive ultrasound or light reflected on the surface of the content sheet P1 or envelope sheet P2 or a transmissive sensor configured to receive light passing through the content sheet P1 or envelope sheet P2 can be used, for example.

Also, a jam sensor 36 is configured to detect a jam of the content sheet P1 or envelope sheet P2 which is being transferred inside the image forming apparatus 3. Though shown by one block for simplicity, the jam sensor 36 is actually formed by a plurality of sensors and disposed at given locations where a jam of a content sheet P1 or envelope sheet P2 may possibly occur.

A plurality of line-type ink heads 11A, 11B, 11C, and 11D configured to eject inks of different colors of cyan (C), black (K), magenta (M), and yellow (Y), respectively, are used in the printing unit 9 to print the notification C1, the address C2, and the barcodes bc1, bc3, and bc5 onto the content sheet P1 or envelope sheet P2.

The content sheet P1 or envelope sheet P2 after being printed is passed to the enclosing-sealing apparatus 5 through a connecting transfer path 35. In the case where the barcodes bc1, bc3, and bc5 are printed on the content sheet P1 or envelope sheet P2, the barcodes bc1, bc3, and bc5 can be read by a barcode reader 38 (code reader) disposed on the connecting transfer path 35. The contents of the barcodes bc1, bc3, and bc5 read by the barcode reader 38 are notified to the image formation controller 37.

Note that an operation menu for the image forming apparatus 3 and a status screen for informing the user of various states that occur in the image forming apparatus 3 such the occurrence of an error is displayed as appropriate on a display 39a (see FIG. 2) of an operation panel 39 provided on top of the casing 7 of the image forming apparatus 3.

As shown in FIG. 2, the image formation controller 37 has the external interface 37a configured to be connected to the client terminal 100 through a local area network LAN. The image formation controller 37 is configured to receive a print job for print images from the client terminal 100.

The image formation controller 37 is configured to create raster data for the print images from the print data of the received print job and performs bitmap expansion. Also, in the case where the print data of the received print job is vector data, the image formation controller 37 is configured to perform RIP conversion from the vector data into raster data and then performs bitmap expansion. The image forming apparatus 3 prints the print images in the printing unit 9 under the conditions specified by the print job.

The image formation controller 37 configured to cause the printing unit 9 to perform print operation includes a CPU 37b. This CPU 37b is configured to control the operation of the printing unit 9, as well as the operation of a transferring system 10 for the content sheets P1 and envelope sheets P2 in the image forming apparatus 3 based on programs and setting information stored in a ROM 37c. The transferring system 10 includes all the transferring systems for transferring the content sheets P1 and envelope sheets P2 in the image forming apparatus 3, such as the sheet-feed transfer paths 21 and 29 of the content sheet feeders 15 and the envelope sheet feeder 23, the registration roller 30, the transfer belt 14, the print transfer path 13, and the switchback transfer path 33.

Moreover, the sheet thickness sensor 34, the jam sensors 36, the barcode reader 38, and the display 39a of the operation panel 39 (see FIG. 1) are connected to the CPU 37b. The display 39a has a touchscreen function, and the CPU 37b recognizes touch operations on the touchscreen.

The CPU 37b compares the sheet thickness of a content sheet P1 and an envelope sheet P2 detected by the sheet thickness sensor 34 with the sheet thickness of the content sheet P1 and the envelope sheet P2 of the same respective types detected the last time, and detects a multi-feed of content sheets P1 or envelope sheets P2 when one of the thicknesses is equal to or larger than the other by a predetermined amount. Then, for example, a multi-feed of envelope sheets P2 is detected for the first letter number after the sheet thickness sensor 34 detects the sheet thickness of the envelope sheet P2 of the next letter number.

Moreover, if one of the jam sensors 36 keeps detecting a content sheet P1 or envelope sheet P2 for a predetermined time or longer, the CPU 37b detects that the content sheet P1 or envelope sheet P2 is jammed at the position where that jam sensor 36 is disposed.

When detecting an error such as a multi-feed or jam of a content sheet P1 or envelope sheet P2 as described above, the CPU 37b stops the transfer and printing of the content sheet P1 or envelope sheet P2 in the image forming apparatus 3. At the same time, the CPU 37b notifies an enclosing-sealing controller 401 of the enclosing-sealing apparatus 5 that the printing is stopped by the occurrence of the error, and displays a status screen for informing of the error state on the display 39a of the operation panel 39.

Note that the image formation controller 37 is provided with a RAM 37d. A frame memory space is provided in the RAM 37d. In this frame memory space, raster data on print images created by the CPU 37b in response to a print job inputted to the image formation controller 37 from the client terminal 100 is temporarily stored until the raster data is outputted to the printing unit 9.

Moreover, the image formation controller 37 is provided with an external storage 37e, and this external storage 37e is connected to the CPU 37b. A space for storing and accumulating outstanding print jobs transferred from the above-mentioned RAM 37d and a space for selectively storing print jobs after their print processes are provided in the external storage 37e.

Configuration of Enclosing-Sealing Apparatus

The enclosing-sealing apparatus 5 is configured to receive printed content sheets P1 and a printed envelope sheet P2 passed through the connecting transfer path 35 of the image forming apparatus 3 onto an introducing transfer path 43 inside a casing 41. The content sheets P1 and envelope sheet P2 thus received are distributed to and transferred onto a content sheet transfer path 45 and an envelope sheet transfer path 47, respectively.

Figure 4:
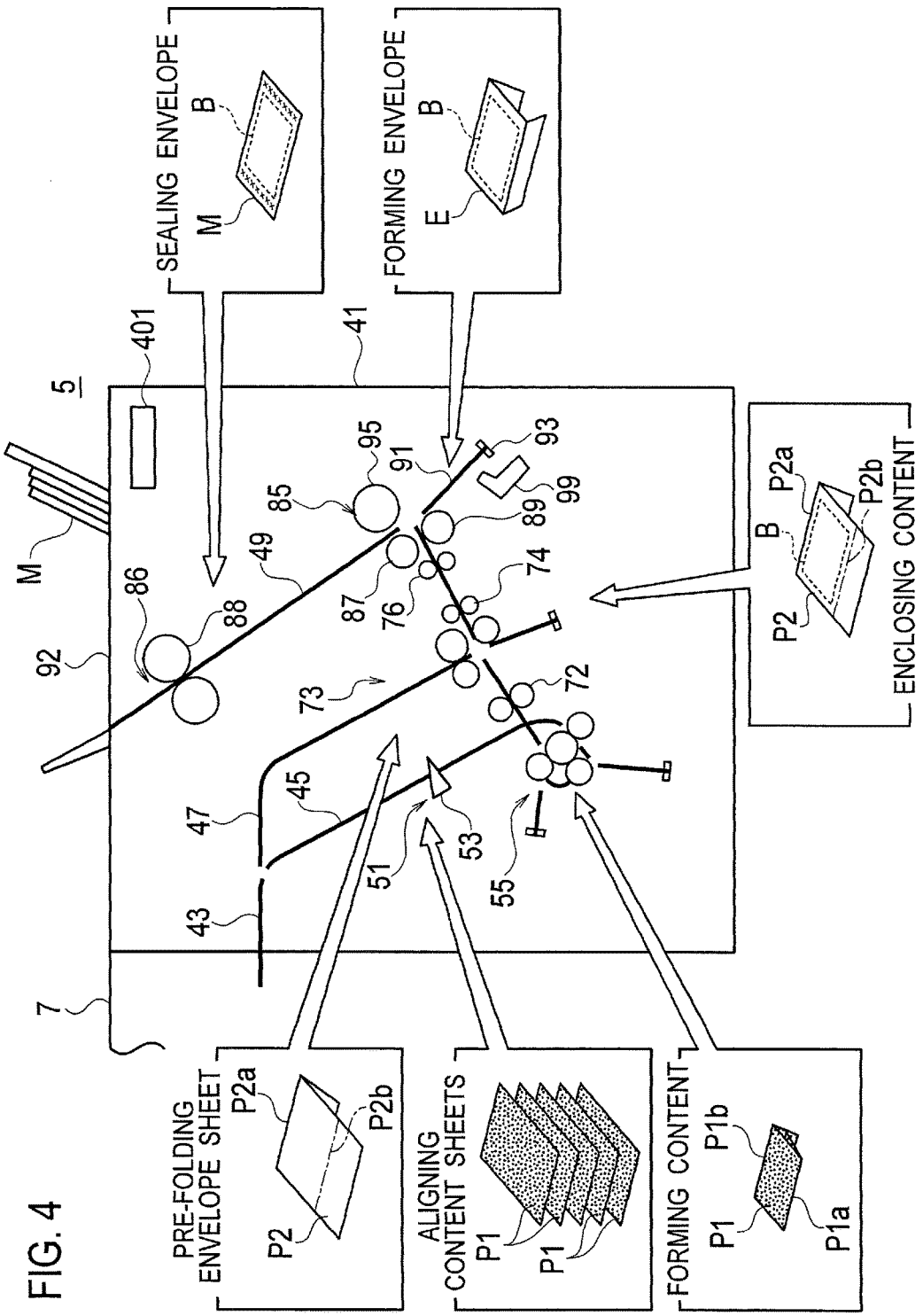
FIG. 4 is an explanatory diagram of the enclosing-sealing apparatus in FIG. 1.

As shown in FIG. 4, the plurality of content sheets P1 transferred along the content sheet transfer path 45 are accumulated and aligned with each other at an aligning gate (waiting gate) 53 of an aligner 51, and then folded as appropriate at folding positions P1a an P1b in a content forming unit 55 to thereby become a content B. The content B after the folding is transferred to an envelope forming unit 85 by a transferring roller 72.

The envelope sheet P2 transferred along the envelope sheet transfer path 47 is pre-folded as appropriate at a folding position P2a in a pre-folding unit 73 and then transferred to the envelope forming unit 85 by transferring rollers 74 and 76. In this step, the content B, which is being transferred to the envelope forming unit 85 by the transferring roller 72, is inserted to the inner side of the folding position P2a on the pre-folded envelope sheet P2.

The envelope sheet P2 holding the content B therein at the folding position P2a is folded at a folding position P2b by a main folding roller 87, an introducing roller 89, and a final folding roller 95 in the envelope forming unit 85. As a result, an envelope E with the content B enclosed therein is formed. The envelope E thus formed is transferred from the envelope forming unit 85 onto an envelope transferring path 49.

The envelope transferring path 49 extends to a sealed letter discharging unit 92 at the top of the casing 41. The envelope transferring path 49 is configured to transfer the envelope E to the sealed letter discharging unit 92 by using a pair of transferring rollers not shown.

A sealing unit 86 is provided at a midway point on the envelope transferring path 49. The sealing unit 86 is configured to seal the envelope E delivered from the envelope forming unit 85. The sealing unit 86 includes a pair of sealing rollers 88 configured to hold and press the open opposite end portions of the envelope E therebetween. The pair of sealing rollers 88 can be rotated by being driven by a motor not shown. The opposite end portions of the envelope E pressed by the pair of sealing rollers 88 are sealed by adhesion of a pressure-sensitive adhesive portion or remoistenable glue portion (not shown) of the envelope sheet P2. As a result, a sealed letter M, which has been sealed, is discharged to the sealed letter discharging unit 92.

The enclosing-sealing controller 401 housed in the casing 41 is configured to control the operation of the enclosing-sealing apparatus 5 having the above configuration. This enclosing-sealing controller 401 receives a notification that the printing of a content sheet P1 or envelope sheet P2 is stopped, from the CPU 37*b* of the image formation controller 37 of the image forming apparatus 3.

Upon receipt of this notification, the enclosing-sealing controller 401 causes the enclosing-sealing apparatus 5 to make a sealed letter M using two content sheets P1 and one envelope sheet P2, which form the sealed letter M, if all of these sheets have been received from the image forming apparatus 3 and, if not, stop the making of the sealed letter M using the content sheets P1 and the envelope sheet P2.

In the enclosing-sealing system 1 configured as described above, based on a print job from the client terminal 100, the image forming apparatus 3 prints images of the notification C1 and the address C2 on content sheets P1 and an envelope sheet P2 and, if necessary, print images of some or all of the three types of barcodes bc1, bc3, and bc5; the enclosing-sealing apparatus 5 then folds the content sheets P1 and the envelope sheet P2 on which these image are printed into a content B and an envelope E, respectively, and further encloses the content B and seals the envelope E to thereby make a sealed letter M.

First Embodiment

Next, an image forming system according to the first embodiment of the present invention will be described which employs the image forming system 2 of the enclosing-sealing system 1 described above.

First, when the CPU 37*b* of the image formation controller 37 of the image forming apparatus 3 detects the occurrence of a jam of a content sheet P1 or envelope sheet P2 with its jam sensor 36, the transfer and printing of the content sheet P1 or envelope sheet P2 in the image forming apparatus 3 are stopped. Then, printing needs to be performed again on a letter basis for the content sheets P1 and the envelope sheet P which have not yet been passed to the enclosing-sealing apparatus 5 from the image forming apparatus 3 at the time of the stop.

In view of this, in the image forming system 2 of this embodiment, the client terminal 100 creates original data for each content sheet P1 and envelope sheet P2 including the barcode bc1 which is barcoded letter number identification information (letter ID), the barcode bc3 which is barcoded next sheet letter number identification information (next sheet letter ID), and the barcode bc5 which is barcoded total sheet quantity information (sheet ID). Also, when outputting a print job including this original data as print data to the image forming apparatus 3, the client terminal 100 creates the letter-number-specific print content table in FIG. 3B and outputs it to the image forming apparatus 3.

In the image forming apparatus 3, on the other hand, as shown in a flowchart in FIG. 5, the CPU 37*b* of the image formation controller 37 first checks whether a print job is inputted (step S1) and, if a print job is inputted (YES in step S1), starts a print process (step S3). In this print process, content sheets P1 and an envelope sheet P2 are transferred in the image forming apparatus 3 in the sequence shown in FIG. 3A and printed in the printing unit 9.

After starting the printing process, the CPU 37*b* reads the barcodes bc1, bc3, and bc5 from the content sheets P1 and the envelope sheet P2 to be passed to the enclosing-sealing apparatus 5 through the connecting transfer path 35 (step S5). Then, from the barcodes bc1, bc3, and bc5 thus read, the CPU 37*b* creates sheet management information and letter management information and store them in the RAM 37*d* (step S7).

Figures 6A, 6B, 7:
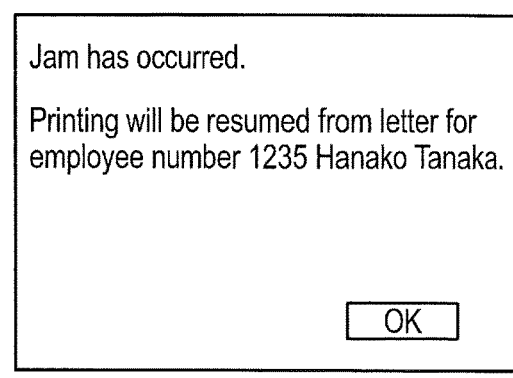
FIG. 6A is an explanatory diagram of sheet management information stored in a RAM by the image formation controller in the procedure in FIG. 5.
FIG. 6B is an explanatory diagram of letter management information stored in the RAM by the image formation controller in the procedure in FIG. 5.
FIG. 7 is an explanatory diagram of a status screen of an error state displayed on a display of the image forming apparatus in FIG. 2 by the procedure in FIG. 5.

Here, as shown in FIG. 6A, the sheet management information is a table in which the total sheet quantity information (sheet ID) of each read barcode bc5 is associated with a status of "printed." Moreover, as shown in FIG. 6B, the letter management information is a table in which the total sheet quantity information (sheet ID) of each read barcode bc5 is associated with the letter number identification information (letter ID) of the barcode bc1 and the next sheet letter number identification information (next sheet letter ID) of the barcode bc3 which are read from the same sheet (content sheet P1 or envelope sheet P2).

Subsequently, the CPU 37*b* checks whether or not any jam sensor 36 has detected the occurrence of a jam of any of the content sheets P1 or the envelope sheet P2 (step S9) and, if no jam has been detected occurring (NO in step S9), returns to step S5 (NO in step S11) until the print process finishes (YES in step S11).

On the other hand, if a jam is detected occurring in step 9 (YES), the CPU 37*b* specifies, from the sheet management information in FIG. 6A, the last sheet (content sheet P1 or envelope sheet P2) passed to the enclosing-sealing apparatus 5 and having the barcode bc5 read by the barcode reader 38 to be the largest total sheet quantity information (sheet ID) (step S13).

Then, the CPU 37*b* checks whether or not the letter number identification information (letter ID) and the next sheet letter number identification information (next sheet letter ID) in the letter management information in FIG. 6B associated with the total sheet quantity information (sheet ID) of the sheet (content sheet P1 or envelope sheet P2) specified in step S13 indicate the same letter number (step S15).

If the letter number identification information (letter ID) and the next sheet letter number identification information (next sheet letter ID) indicate the same letter number (YES in step S15), the CPU 37*b* sets the letter number indicated by that letter number identification information (letter ID) as the first letter number from which the printing will be resumed when the jam is solved (step S17), and proceeds to step S21 to be described later.

On the other hand, if the letter number identification information (letter ID) and the next sheet letter number identification information (next sheet letter ID) do not indicate the same letter number (NO in step S15), the CPU 37*b* sets the letter number indicated by that next sheet letter number identification information (next sheet letter ID) as the first letter number from which the printing will be resumed when the jam is solved (step S19), and proceeds to step S21.

In step S21, the CPU 37*b* specifies the content of the address C2 to be printed on the envelope sheet P2 of the letter number to be printed first when the printing is resumed (the letter number indicated by the letter ID or the letter number indicated by the next sheet letter ID), from the letter-number-specific print content table T from the client terminal 100 shown in FIG. 3B. Then, as shown in FIG. 7, the CPU 37b displays the content of the address C2 thus specified on the display 39a as a status screen of an error state.

According to the image forming system 2 of the first embodiment configured as described above, when a jam occurs in the image forming apparatus 3, the letter numbers of the sealed letters M are specified which are to be made from the sheets (content sheet(s) P1 and envelope sheet(s) P2) having failed to be passed from the image forming apparatus 3 to the enclosing-sealing apparatus 5 due to the jam. Then, the address C2 to be printed on the envelope sheet P2 which forms the sealed letter M of the smallest letter number among the specified letter numbers is displayed on the display 39a as information on the first letter number from which the printing will be resumed.

In this way, from the address C2 displayed on the display 39a, it is possible to specify the sealed letter M to be made from the sheets involved in the jam (content sheet(s) P1 and/or envelope sheet P2), and therefore present useful information when the printing is to be resumed, for example, information on from which sealed letter M's sheets the printing will be resumed when the jam is solved.

Note that although the above embodiment is described based on the example where an error related to the transfer of a sheet (content sheet P1 or envelope sheet P2) occurs due to a jam, similar operations can be performed also when an error related to the transfer of the sheet (content sheet P1 or envelope sheet P2) occurs due to other reasons.

For example, when the image forming apparatus 3 stops operating due to a power outage, an error may be assumed to have occurred at the time when the power outage is fixed and the power supply to the image forming apparatus 3 is regained, and the operations in and after step S13 in the flowchart in FIG. 5 may be performed, as in the case where a jam is detected occurring in step S9 (YES).

In this way, the first letter number from which the printing will be resumed after the power outage is fixed can be informed of by means of the address C2 to be printed on the sealed letter M through a status screen of an error state displayed on the display 39a.

Second Embodiment

Subsequently, an image forming system according to the second embodiment of the present invention will be described which employs the image forming system 2 of the enclosing-sealing system 1 described above.

First, the multi-feed detection performed by the CPU 37b of the image formation controller 37 of the image forming apparatus 3 by using the sheet thickness sensor 34 cannot detect whether the envelope sheet P2 of, for example, the first letter number is involved in a multi-feed until the sheet thickness sensor 34 detects the sheet thickness of the envelope sheet P2 of the next letter number. By the time the envelope sheets P2 of the first letter number is detected being involved in a multi-feed, the multi-fed envelope sheets P2 of the first letter number might already be passed to the enclosing-sealing apparatus 5 and formed into a sealed letter M in the enclosing-sealing apparatus 5 together with the two content sheets P1 which have been passed thereto before the envelope sheets P2.

Sealed letters M discharged to the sealed letter discharging unit 92 would not be able to stay in the order in which they are discharged as the number of sealed letters M increases. It is then difficult to specify the sealed letter M using the multi-fed envelope sheets P2 from among them. It is also difficult to specify the sealed letter M using the multi-fed envelope sheets P2 when sealed letters M made in previous print jobs are still remaining on the sealed letter discharging unit 92.

In view of this, in the image forming system 2 of this embodiment, the client terminal 100 creates original data for each content sheet P1 and envelope sheet P2 including the barcode bc1 which is barcoded letter number identification information (letter ID) and the barcode bc5 which is barcoded total sheet quantity information (sheet ID). Also, when outputting a print job including this original data as print data to the image forming apparatus 3, the client terminal 100 creates the letter-number-specific print content table in FIG. 3B and outputs it to the image forming apparatus 3.

Figure 8:
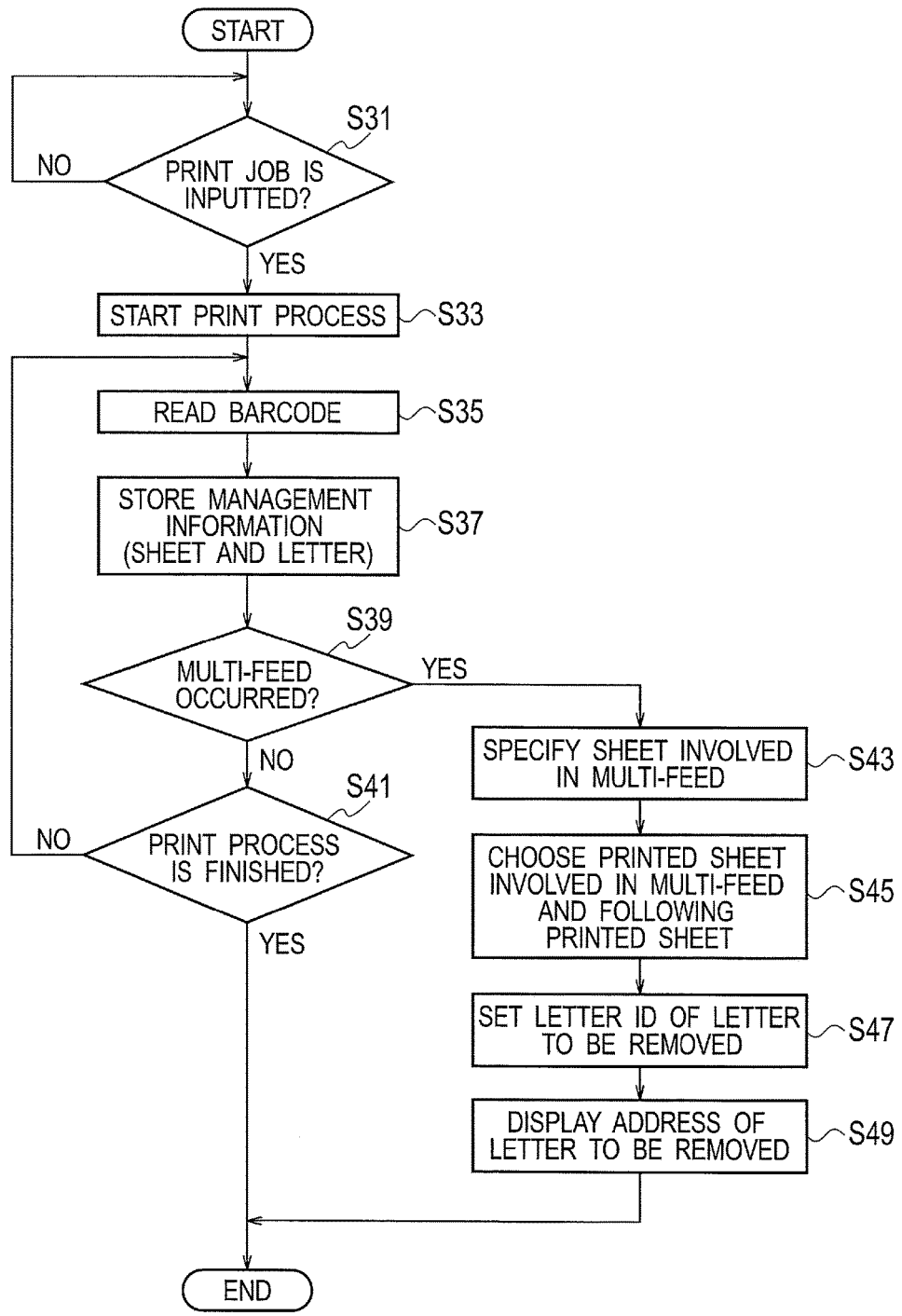
FIG. 8 is a flowchart showing a procedure performed upon occurrence of an error based on control by an image formation controller of the image forming apparatus in the image forming system according to the second embodiment.

In the image forming apparatus 3, on the other hand, as shown in a flowchart in FIG. 8, the CPU 37b of the image formation controller 37 first checks whether a print job is inputted (step S31) and, if a print job is inputted (YES in step S31), starts a print process (step S33). In this print process, content sheets P1 and an envelope sheet P2 are transferred in the image forming apparatus 3 in the sequence shown in FIG. 3A and printed in the printing unit 9.

After starting the printing process, the CPU 37b reads the barcodes bc1 and bc5 from the content sheets P1 and the envelope sheet P2 to be passed to the enclosing-sealing apparatus 5 through the connecting transfer path 35 (step S35). Then, from the barcodes bc1 and bc5 thus read, the CPU 37b creates sheet management information and letter management information and store them in the RAM 37d (step S37).

Here, the sheet management information includes the same content as the sheet management information of the first embodiment shown in FIG. 6A. Moreover, the letter management information is a table being the letter management information of the first embodiment shown in FIG. 6B from which the association with the next sheet letter number identification information (next sheet letter ID) of the barcode bc3 is omitted. In other words, the letter management information of this embodiment is a table in which the total sheet quantity information (sheet ID) of each read barcode bc5 is associated with the letter number identification information (letter ID) of the barcode bc1 read from the same sheet (content sheet P1 or envelope sheet P2).

Subsequently, the CPU 37b checks whether or not the sheet thickness sensor 34 has detected the occurrence of a multi-feed of content sheets P1 or envelope sheets P2 (step S39) and, if no multi-feed has been detected occurring (NO in step S39) and if the print process is not yet finished (NO in step S41), returns to step S35 and, if the print process is finished (YES in step S41), terminates the series of operations.

On the other hand, if a multi-feed is detected occurring in step 39 (YES), the CPU 37b specifies the sheet with which the multi-feed is detected, out of the two sheets (of the same type) of which the sheet thicknesses are detected by the sheet thickness sensor 34 and compared with each other for the multi-feed detection (step S43).

Then, the CPU 37b chooses each sheet with total sheet quantity information (sheet ID) associated with the status of "printed" in the sheet management information in FIG. 6A from among the pieces of total sheet quantity information (sheet IDs) on the sheet (content sheet P1 or envelope sheet P2) specified in step S43 as being involved in the multi-feed and on following sheets (step S45).

Further, the CPU 37b sets the letter number identification information (letter ID) in the letter management information in FIG. 6B associated with the total sheet quantity information (sheet ID) on each sheet (content sheet P1 or envelope sheet P2) chosen in step S45, as the letter number of the sealed letter M to be removed from the sealed letter discharging unit 92 of the enclosing-sealing apparatus 5 (step S47).

Subsequently, the CPU 37b specifies the content of the address C2 printed on the envelope sheet P2 of the letter number of the sealed letter M to be removed from the sealed letter discharging unit 92 of the enclosing-sealing apparatus 5, from the letter-number-specific print content table T from the client terminal 100 shown in FIG. 3B. Then, the CPU 37b displays a status screen of an error state on the display 39a by using the content of the specified address C2 (step S49).

Here, the first letter number among those of the sealed letters M to be removed from the sealed letter discharging unit 92 is also the letter number that needs to be printed again firstly after the printing is resumed. In view of this, in this embodiment, as shown in FIG. 9, the contents of the addresses C2 printed on the envelope sheets P2 which form the sealed letters M of the letter numbers to be removed from the sealed letter discharging unit 92 are displayed on the status screen of the error state displayed on the display 39a; in addition to this, the content of the address C2 printed on the envelope sheet P2 which forms the sealed letter M of the letter number corresponding to the smallest letter number identification information (letter ID) among the letter numbers to be removed, is displayed on the status screen as the first letter number to be printed after the printing is resumed.

According to the image forming system 2 of the second embodiment configured as described above, when a multi-feed, in which a plurality of content sheets P1 or envelope sheets P2 are stacked and transferred, occurs in the image forming apparatus 3, the address C2 on the sealed letter M made using the multi-fed sheets (content sheets P1 or envelope sheets P2) is displayed on the status screen on the display 39a.

In this way, the sealed letter M made using the multi-fed sheets (content sheets P1 or envelope sheets P2) can be easily selected and reliably removed from sealed letters M discharged to the sealed letter discharging unit 92 of the enclosing-sealing apparatus 5.

In each of the above embodiments, the barcodes bc1, bc3, and bc5 are printed on both the content sheets P1 and the envelope sheet P2. Note, however, that if only either of the content sheets P1 and the envelope sheet P2 needs to be sheets or a sheet required to be checked whether or not the sheets are or the sheet is passed from the image forming apparatus 3 to the enclosing-sealing apparatus 5, necessary ones of the barcodes bc1, bc3, and bc5 may be printed on the sheets or the sheet required to be checked so.

Moreover, the letter number identification information (letter ID), the next sheet letter number identification information (next sheet letter ID), and the total sheet quantity information (sheet ID) may be coded into codes other than the barcodes bc1, bc3, and bc5. For example, these pieces of information (IDs) may be coded into two-dimensional codes such as QR codes (registered trademark of DENSO WAVE Incorporated) and/or coded into one code.

Further, the above embodiments are described based on the example where the image forming apparatus 3, which is used in combination with the enclosing-sealing apparatus 5, has the one-pass inkjet printing unit 9 having line-type inkjet heads. However, the present invention is applicable to enclosing-sealing apparatuses used in combination with an image forming apparatus having a serial-head inkjet printing unit or an image forming apparatus of an electrophotographic type or the like other than the inkjet type. Moreover, the present invention is applicable to image forming apparatuses used alone without any enclosing-sealing apparatus, of course.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. An image forming apparatus, comprising:
a printer configured to perform printing of an image on at least one content sheet and one envelope sheet of a first sealed letter, wherein the first sealed letter is formed outside of the image forming apparatus by inserting the at least one content sheet into the one envelope sheet, and sealing the envelope sheet, the image including a first sealed letter number identification code for identifying a first sealed letter number of the first sealed letter to be formed and a next sealed letter number identification code for identifying a next sealed letter number of a next sealed letter to be formed;
a content sheet feeder configured to feed the at least one content sheet to the printer;
an envelope sheet feeder configured to feed the envelope sheet to the printer;
a transfer path configured to transfer and discharge the at least one content sheet and the envelope sheet, printed by the printer, to the outside of the image forming apparatus;
a code reader arranged on the transfer path and configured to read the first and next sealed letter number identification codes from the at least one content sheet and the envelope sheet being transferred on the transfer path and output the first and next sealed letter number identification codes as read to a processor;
wherein the processor is configured to execute instructions stored in a memory to:
detect an occurrence of a transfer error of the at least one content sheet or the envelope sheet;
stop the printer;
specify a last sheet discharged before the at least one content sheet or the envelope sheet was involved in the detected transfer error;
specify, based on the next sealed letter number identification code of the last sheet read by the code reader, the first sealed letter number of the at least one content sheet or the envelope sheet involved in the detected transfer error, wherein the specified first sealed letter number is informed to a user;
search a sealed-letter-number-specific print content table, in which sealed letter numbers and print content information indicating a content of the image to be printed on corresponding envelope sheets are associated with each other;
find print content information associated with the specified first sealed letter number of the at least one content sheet or the envelope sheet involved in the detected transfer error, and output the found print content information to a display to indicate the specified first sealed letter number to be printed when the detected transfer error is solved and printing is resumed.

2. The image forming apparatus according to claim 1, wherein the processor is further configured to:
detect a multi-feed of sheets as the detected transfer error;
specify a sealed letter number associated with the sheets detected as the multi-feed; and
output print content information associated with the specified sealed letter number of the sheets detected as the multi-feed.

3. The image forming apparatus according to claim 1, wherein the transfer path transfers and discharges the at least one content sheet and the envelope sheet of the letter to be sealed to an enclosing-sealer configured to form each sealed letter by enclosing and sealing the at least one printed content sheet within the envelope sheet.

4. The image forming apparatus according to claim 1, wherein the processor creates original data for each of the at least one content sheet and the envelope sheet, which includes a first barcode that is a barcoded letter number identification, a second barcode that is a barcoded next sheet letter number identification information, and a third barcode that is total sheet quantity information.

5. The image forming apparatus according to claim 1, wherein the printing is resumed based on the specified first sealed letter number and the found print content information.

6. An image forming system, comprising:
an image forming apparatus including:
a printer configured to perform printing of an image on at least one content sheet and one envelope sheet of a first sealed letter, wherein the first sealed letter is formed outside of the image forming apparatus by inserting the at least one content sheet into the one envelope sheet and sealing the envelope sheet, the image including a first sealed letter number identification code for identifying a first sealed letter number of the first sealed letter to be formed and a next sealed letter number identification code for identifying a next sealed letter number of a next sealed letter to be formed;
a content sheet feeder configured to feed the at least one content sheet to the printer;
an envelope sheet feeder configured to feed the envelope sheet to the printer;
a transfer path configured to transfer and discharge the at least one content sheet and the envelope sheet, printed by the printer, to the outside of the image forming apparatus;
a code reader arranged on the transfer path and configured to read the first and next sealed letter number identification code from the at least one content sheet and envelope sheet being transferred on the transfer path and output the first sealed letter number identification code and the next sealed letter number identification code as read to a first processor, which includes a first memory that stores instructions,
wherein the first processor is configured to execute the instructions stored in the first memory to:
detect an occurrence of a transfer error of the at least one content sheet or the envelope sheet;
stop the printer;
specify a last sheet discharged before the at least one content sheet or the envelope sheet was involved in the detected transfer error;
specify, based on the next sealed letter number identification code of the last sheet read by the code reader, the first sealed letter number of the at least one content sheet or the envelope sheet involved in the detected transfer error, wherein the specified first sealed letter number is informed to a user;
search a sealed-letter-number-specific print content table, in which sealed letter numbers and print content information indicating a content of the image to be printed on corresponding envelope sheets are associated with each other;
find print content information associated with the specified first sealed letter number of the at least one content sheet or the envelope sheet involved in the detected transfer error; and
output the found print content information to a display to indicate the specified first sealed letter number to be printed when the detected transfer error is solved and printing is resumed; and
a terminal having a second processor, which includes a second memory that stores instructions;
wherein the second processor is configured to execute the instructions stored in the second memory to:
output a print job to the image forming apparatus, the print job instructing printing of the image including the first sealed letter number identification code and the next sealed letter number identification code on the at least one content sheet and the one envelope sheet that forms the first sealed letter; and
output information of the sealed-letter-number-specific print content table to the image forming apparatus together with the print job.

7. The image forming system according to claim 6, wherein the transfer path transfers and discharges the at least one content sheet and the envelope sheet of the letter to be sealed to an enclosing-sealer configured to form each sealed letter by enclosing and sealing the at least one printed content sheet within the envelope sheet.

8. The image forming system according to claim 6, wherein the first processor creates original data for each of the at least one content sheet and the envelope sheet, which includes a first barcode that is a barcoded letter number identification, a second barcode that is a barcoded next sheet letter number identification information, and a third barcode that is total sheet quantity information.

9. The image forming system according to claim 6, wherein the printing is resumed based on the specified first sealed letter number and the found print content information.

10. The image forming system according to claim 6, wherein the first processor is further configured to
detect a multi-feed of sheets as the detected transfer error;
specify a sealed letter number associated with the sheets detected as the multi-feed; and
output print content information associated with the specified sealed letter number of the sheets detected as the multi-feed.

* * * * *